United States Patent
Shu et al.

(10) Patent No.: US 11,014,083 B2
(45) Date of Patent: May 25, 2021

(54) METHOD FOR PREPARING A RARE-EARTH MODIFIED KEGGIN-TYPE HETEROPOLYACID-SUPPORTED CATALYST AND METHOD FOR PREPARING A BIODIESEL

(71) Applicant: Jiangxi University of Science and Technology, Ganzhou (CN)

(72) Inventors: Qing Shu, Ganzhou (CN); Jing Xiao, Ganzhou (CN); Baoquan Xu, Ganzhou (CN); Caixia Zhang, Ganzhou (CN); Laixi Zou, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 0 days.

(21) Appl. No.: 16/779,962

(22) Filed: Feb. 3, 2020

(65) Prior Publication Data
US 2020/0298222 A1 Sep. 24, 2020

(30) Foreign Application Priority Data
Mar. 21, 2019 (CN) .......................... 201910219619.4

(51) Int. Cl.
*B01J 37/03* (2006.01)
*B01J 23/10* (2006.01)
*B01J 37/02* (2006.01)
*B01J 37/04* (2006.01)
(Continued)

(52) U.S. Cl.
CPC ............. *B01J 37/036* (2013.01); *B01J 23/10* (2013.01); *B01J 37/0236* (2013.01); *B01J 37/04* (2013.01); *C10G 7/06* (2013.01); *B01J 21/185* (2013.01); *C10G 2400/04* (2013.01)

(58) Field of Classification Search
CPC ........ B01J 21/185; B01J 23/10; B01J 27/188; B01J 37/0236; B01J 37/036; B01J 37/04; C10G 7/06; Y02E 50/10; Y02P 30/20
See application file for complete search history.

(56) References Cited

FOREIGN PATENT DOCUMENTS

| CN | 1974001 A | 6/2007 |
|----|-----------|--------|
| CN | 103691483 A | 4/2014 |
| CN | 104332597 A | 2/2015 |

(Continued)

OTHER PUBLICATIONS

Machine translation of Shu etal (CN 105854943) published Aug. 17, 2016.*

(Continued)

*Primary Examiner* — Brian A McCaig
(74) *Attorney, Agent, or Firm* — Gearhart Law LLC; David Postolski, Esq.

(57) ABSTRACT

Disclosed is a method for preparing a rare-earth modified Keggin-type heteropolyacid-supported catalyst. Carbon nanotube is used as support, and is oxidized to form openings and cut into short tubes by an acidic solution. Under the action of metal chlorides and alcohol solvents, the end and the defect sites on the side walls of the carbon nanotubes are combined with hydroxyl groups to obtain hydroxylated carbon nanotube. In this way, the surface properties of the carbon nanotube are changed, and the active components are more easily and firmly adsorbed on the carbon nanotube, thus the stability of the catalyst is improved.

20 Claims, 7 Drawing Sheets

(51) Int. Cl.
    C10G 7/06    (2006.01)
    B01J 21/18   (2006.01)

(56) References Cited

FOREIGN PATENT DOCUMENTS

| | | |
|---|---|---|
| CN | 104477881 A | 4/2015 |
| CN | 105529485 A | 4/2016 |
| CN | 105728001 A | 7/2016 |
| CN | 105854939 A | 8/2016 |
| CN | 105854943 A | 8/2016 |
| CN | 106563459 A | 4/2017 |
| WO | 2017007663 A1 | 5/2017 |

OTHER PUBLICATIONS

Machine translation of Cai etal (CN 105728001) published Jul. 6, 2016.*
First Office Action dated Jul. 9, 2020 issued in Chinese Application No. 201910219619.4.
Second Office Action dated Oct. 9, 2020 issued in Chinese Application Application No. 201910219619.4.
Yang Ying et al, "The Structure, Properties, Synthesis and Application of Carbon Nanotubes", Heilongjiang University, 2013, 4 pages.
First Office Action dated Feb. 8, 2011 issued in Japanese Application No. 2020-017025.

* cited by examiner

METHOD FOR PREPARING A RARE-EARTH MODIFIED KEGGIN-TYPE HETEROPOLYACID-SUPPORTED CATALYST AND METHOD FOR PREPARING A BIODIESEL

CROSS-REFERENCE TO RELATED APPLICATION

This application claims priority benefits to Chinese Patent Application No. 201910219619.4, filed on Mar. 21, 2019. The contents of all of the aforementioned applications are incorporated herein by reference.

FIELD OF THE EMBODIMENTS

The present invention belongs to the technical field of catalyst preparation, and particularly relates to a method for preparing a rare-earth modified Keggin-type heteropolyacid-supported catalyst and use thereof.

BACKGROUND OF THE EMBODIMENTS

Heteropolyacid is an oxygen-containing polyacid consisting of heteroatoms or central atoms (such as P, Si, Fe, Co, etc.) bridged with multiple coordination atoms (transition metals such as V, Nb, Mo, W) and oxygen atoms in accordance with a specific coordination, and has high catalytic activity. Keggin-type heteropolyacid is currently the most widely used type of heteropolyacid having a molecular formula of $H_nXM_{12}O_{40} \cdot nH_2O$, such as phosphotungstic acid, phosphomolybdic acid and silicotungstic acid. Keggin-type heteropolyacid has not only redox properties, but also strong Brönsted acidity. Keggin-type heteropolyacid has "pseudo-liquid phase" behavior, allowing some smaller molecules to enter and exit its interior freely and to react on acidic active sites in the surface and internal thereof. Therefore, Keggin-type heteropolyacid can be used as a catalyst for homogeneous reaction and heterogeneous reaction, and even as a phase transfer catalyst, which is environmentally friendly and is a promising green multifunctional catalyst.

However, Keggin-type heteropolyacid is easily soluble in water, difficult to recycle and reuse, and easy to react with water and thus loses activity since it is a Brönsted solid acid. In order to improve the catalytic activity of Keggin-type heteropolyacids in an aqueous reaction medium, heteropolyacids are usually mixed and doped with an alkali metal or a rare earth element metal in the prior art. For example, Chinese patent application CN105854943A disclosed a method for preparing a rare-earth modified Keggin-type heteropolyacid catalyst, comprising modifying heteropolyacid with a compound comprising rare earth M in the presence of a strong acid solution to form a stable M-O bond between the rare earth M and O in the heteropoly acid, thereby improving the activity of the catalyst. However, the resulted catalyst also has the problem that the catalyst is difficult to be separated from the product and is difficult to be recovered, like traditional homogeneous catalysts. To solve this problem, a rare-earth modified heteropolyacid-supported catalyst was proposed, comprising multi-walled carbon nanotubes as a support. The carbon nanotubes were treated with a strong oxidizing acid to remove carbon deposits on the surface area thereof, increase the oxygen-containing functional groups and allow the active components to be firmly adsorbed on the functional groups, thereby improving the stability of the catalyst. However, the acid treated carbon nanotubes did not show catalytic activity in subsequent reactions, and thus did not have synergistic effect to further improve the catalytic activity of the catalysts. Therefore, improvement in the catalytic performance of the rare earth modified heteropolyacid-supported catalyst obtained by treating carbon nanotubes with strong oxidizing acid is not obvious.

SUMMARY OF THE EMBODIMENTS

The present invention is designed to overcome the defects that improvement in the catalytic performance of the rare earth modified heteropolyacid-supported catalyst in the prior art is not obvious. Therefore, the present invention provides a method for preparing a rare-earth modified Keggin-type heteropolyacid-supported catalyst and use thereof. The catalyst obtained by this method has high catalytic activity and is easy to be recovered for reuse.

In order to solve the above technical problem, the present invention provides a method for preparing a rare-earth modified Keggin-type heteropolyacid-supported catalyst, comprising the steps of:

(1) preparing a first mixture solution by dispersing a carbon nanotube, a metal chloride and a first acid solution in a first alcohol solvent, filtering the first mixture solution to produce a first filter cake, and drying the first filter cake to obtain a hydroxylated carbon nanotube;

(2) preparing a second mixture solution by dispersing a metal precursor, a second acid solution, a rare earth compound, a Keggin-type heteropolyacid and the hydroxylated carbon nanotube in a second alcohol solvent, wherein the rare earth compound has at least one rare earth element selected from the group consisting of lanthanum, cerium, praseodymium, neodymium, promethium and samarium; and (3) allowing the second mixture solution to stand until a gel is formed, drying the gel to obtain a rare earth modified Keggin-type heteropolyacid-supported catalyst.

Preferably, in the step (1), the carbon nanotube is a single-walled carbon nanotube or a multi-walled carbon nanotube; the metal chloride is $AlCl_3$ and/or $MgCl_2$; the first acid solution is at least one selected from the group consisting of a nitric acid solution, a sulfuric acid solution, and a hydrochloric acid solution, having a $H^+$ concentration of 0.1 mol/L to 1 mol/L; and the first alcohol solvent is an ethanol solvent or a propanol solvent, having a concentration of 60 wt % to 99 wt %.

Preferably, the step (1) comprises:

preparing the first mixture solution by mixing 0.1 g to 0.5 g of the carbon nanotube, 8 mL to 10 mL of a solution of the metal chloride having a concentration of 0.1 mol/L to 1 mol/L and 10 mL to 20 mL of the first alcohol solvent uniformly, subjecting the resulted solution to ultrasonic treatment for 2 min to 10 min, then adding 1 mL to 2 mL of the first acid solution to the solution, and further subjecting the solution to microwave treatment for 1 min to 8 min, and adjusting the solution to a pH of neutral, and filtering the first mixture solution to obtain a first filter cake, and drying the first filter cake to obtain a hydroxylated carbon nanotube powder.

Preferably, in the step (2), the metal precursor is a silicic acid organic alcohol ester and/or a silicon alkoxide; the second acid solution is at least one selected from the group consisting of a nitric acid solution, a sulfuric acid solution, and a hydrochloric acid solution, having a $H^+$ concentration of 0.1 mol/L to 1 mol/L; the rare earth compound is rare earth chloride or rare earth nitrate; and the Keggin-type heteropolyacid is at least one selected from the group consisting of tungstophosphoric heteropolyacid, phosphomolybdic heteropolyacid and silicotungstic heteropolyacid; and the second alcohol solvent is an ethanol solvent or a propanol solvent.

Preferably, the step (2) comprises: preparing the second mixture solution by dispersing 3 g to 5 g of the metal precursor, 8 mL to 10 mL of the second acid solution, 0.1 g to 0.2 g of the rare earth compound, 2 g to 2.5 g of the Keggin-type heteropolyacid and 0.1 g to 0.5 g of the hydroxylated carbon nanotube in 2 mL to 2.5 mL of the second alcohol solvent.

Preferably, said preparing the second mixture solution in the step (2) comprises:
  mixing the metal precursor, the second alcohol solvent and the second acid solution uniformly, and then adding the rare earth compound, the Keggin-type heteropolyacid and the hydroxylated carbon nanotube; or
  mixing the metal precursor and the second alcohol solvent uniformly, and then adding the second acid solution, the rare earth compound, the Keggin-type heteropolyacid and the hydroxylated carbon nanotube.

Preferably, in the steps (1) and (3), the drying is carried out at a temperature of 110° C. to 120° C. for a period of 3 min to 8 min; and in the step (3), the second mixture solution is allowed to stand for a period of 12 h to 24 h at a temperature of 20° C. to 35° C.

The present invention also provides a method for preparing a biodiesel, comprising the steps of:
  preparing a rare-earth modified Keggin-type heteropolyacid-supported catalyst with the above method,
  preparing a reaction product from a grease and methanol by carrying out esterification and transesterification reactions in the presence of the rare-earth modified Keggin-type heteropolyacid-supported catalyst, and
  neutralizing the reaction product to a pH of 8 to 9, washing with water to neutral, drying, followed by vacuum distilling to obtain a biodiesel.

Preferably, the catalyst accounts for 0.2% to 1.5% of a total mass of the grease and the methanol, and the esterification and transesterification reactions are carried out at a temperature of 55° C. to 70° C. for a period of 3 h to 6 h.

The present invention has the following advantages:
1. In the method for preparing a rare-earth modified Keggin-type heteropolyacid-supported catalyst, carbon nanotube is used as a support and is oxidized to form openings and cut into short tubes by an acidic solution. Under the action of metal chlorides and the first alcohol solvent, hydroxyl groups are bound to ends and/or defect sites on side walls of the carbon nanotubes, thereby forming hydroxylated carbon nanotubes. In this way, the surface properties of the carbon nanotubes are changed, and the active components are more easily and firmly adsorbed on the carbon nanotubes, thus the stability of the catalyst is improved. Furthermore, the hydroxylated carbon nanotube shows activity to improve the activity of the catalyst. This is because when carbon nanotube-supported rare-earth modified heteropolyacid is prepared with sol-gel method, metal precursors such as ethyl orthosilicate (TEOS) are easy to hydrolyze and to form $SiO_2$ network under acidic conditions, and $(Si-OH_2^+)$ existing in the $SiO_2$ network coordinates with W in Keggin-type heteropolyacid such as $H_3PW_{12}O_{40}$ to form a complex $(Si-OH^+)(H_2PW_{12}O_{40}^-)$ which has strong electrostatic adsorption property. When the complex is dried at high temperature, the complex further bonds with the hydroxyl groups in the hydroxylated carbon nanotube and with the rare earth metal ions to form an active component $(RPW_{12}O_{40}-SiO_2$, where R is a rare earth metal). Due to the strong electron-withdrawing effect of the rare earth metal ions, e in the carbon tube will move to the surface of the rare earth metal ions and disperse in the benzene-like ring structure thereof, forming highly delocalized $\pi$ electrons, which have a strong attraction to rare earth metal elements, thus contributing to the formation of Lewis acid sites, improving the activity of the catalyst, and meanwhile improving the stability of the catalyst. In addition, by modifying the heteropoly acids with rare earth compounds in the presence of an acid solution, and by limiting the specific amounts of acids in the acid solution, the rare earth compounds and heteropoly acids, the rare earth compounds are more easily impregnated into the heteropoly acids and interact with O in the heteropoly acid to form a stable M-O bond which can act as an acidic active center, thereby obtaining a catalyst with high catalytic activity and stability. Meanwhile, by limiting the metal precursor and the alcohol, a gel is formed through hydrolysis and polycondensation reactions of the metal precursor, so that each component is uniformly dispersed in the gel, and after drying the gel, a rare earth modified Keggin-type heteropolyacid-supported catalyst is obtained, which has higher catalytic activity and stability.
2. In the method for preparing a rare-earth modified Keggin-type heteropolyacid-supported catalyst, ultrasonic treatment and microwave treatment are carried out to strengthen the impregnation of the rare-earth compound, so that a more stable M-O bond is formed between the rare-earth metal and O in the heteropoly acid, and the attraction of M to the surface of the carbon nanotubes with hydroxyl functionalized sidewall is enhanced, thereby further improving the catalytic activity and stability of the catalyst.
3. In the use of a rare-earth modified Keggin-type heteropolyacid-supported catalyst provided by the present invention, by using a rare-earth modified Keggin-type heteropolyacid-supported catalyst prepared by the method in the present invention as a catalyst, the yield of biodiesel is improved (the yield of biodiesel reaches 96% at 65° C. in 5 hours), with good repeatability, and the catalyst is easy to separate.

DETAILED DESCRIPTION OF THE PREFERRED EMBODIMENT

Figure 1:
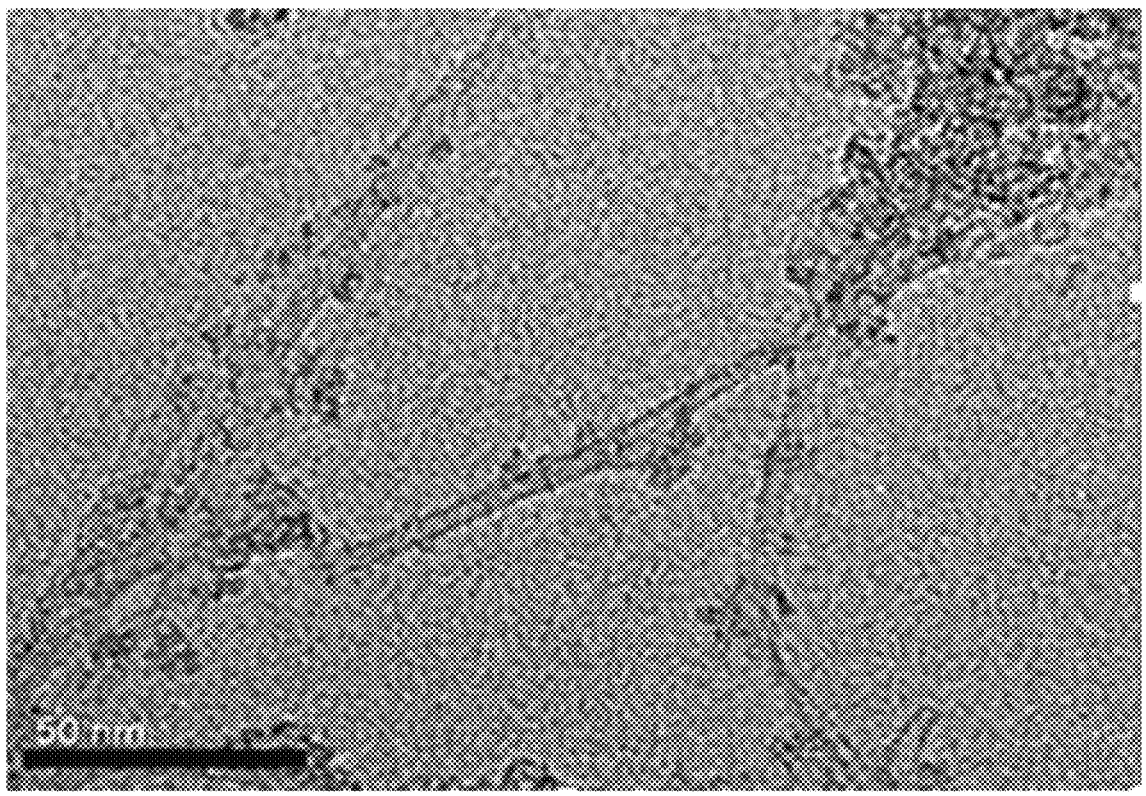
FIG. 1 shows a transmission electron microscope image of a catalyst obtained in embodiment 1 of the present invention.

The following embodiments are provided for a better understanding of the present invention, are not to limit the preferable embodiment, and are not to limit the content and protection scope of the present invention. Any product that is the same as or similar to the present invention obtained by anyone under the teaching of the present invention or by combining with other features of the prior art falls within the protection scope of the present invention.

For any embodiment where the experimental steps or conditions are not indicated, the embodiment is carried out according to conventional operations or conditions as described in prior art documents. For any reagents or instruments where the manufacturer is not indicated, all of them are conventional reagent products that are commercially available.

Embodiment 1

Provided is a rare-earth modified Keggin-type heteropolyacid-supported catalyst, which is prepared as follows:

Adding 0.1 g single-walled carbon nanotubes and 10 mL 0.1 mol/L $AlCl_3$ solution to a beaker, stirring with a glass rod, then adding 20 mL 60 wt % ethanol thereto, and carrying out ultrasonic treatment for 4 min to uniformly disperse the single-walled carbon nanotubes in the solution. After the ultrasonic treatment is completed, adding 1 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 120° C. for 3 min to obtain a hydroxylated single-walled carbon nanotube powder.

Adding 4 g ethyl orthosilicate to 2 mL ethanol and stirring well; and then adding 10 mL dilute nitric acid (having a $C_H^+$ concentration of 1 mol/L), 0.1 g $La(NO_3)_3$, 2 g tungstophosphoric heteropolyacid and 0.01 g said hydroxylated single-walled carbon nanotube powders thereto, stirring well, and then carrying out ultrasonic treatment for 5 min to obtain a second mixture solution.

Allowing the second mixture solution to stand for 12 h at 35° C. to obtain a gel, which was dried in an incubator at 110° C. for 4 min, then taken out, and ground into powder to obtain a rare-earth modified Keggin-type heteropolyacid-supported catalyst.

Embodiment 2

Provided is a rare-earth modified Keggin-type heteropolyacid-supported catalyst, which is prepared as follows:

Adding 0.2 g single-walled carbon nanotubes and 10 mL 0.2 mol/L $MgCl_2$ solution to a beaker, stirring with a glass rod, then adding 20 mL 70 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 120° C. for 3 min to obtain a hydroxylated single-walled carbon nanotube powder.

Adding 3 g ethyl orthosilicate to 1.5 mL ethanol and stirring well; and then adding 8 mL dilute nitric acid (having a $C_H^+$ concentration of 1 mol/L), 0.125 g $La(NO_3)_3$, 2.5 g tungstophosphoric heteropolyacid and 0.01 g said hydroxylated single-walled carbon nanotube powders thereto, stirring well, and then carrying out ultrasonic treatment for 3 min to obtain a second mixture solution.

Allowing the second mixture solution to stand for 24 h at 20° C. to obtain a gel, which was dried in an incubator at 110° C. for 5 min, then taken out, and ground into powder to obtain a rare-earth modified Keggin-type heteropolyacid-supported catalyst.

Embodiment 3

Provided is a rare-earth modified Keggin-type heteropolyacid-supported catalyst, which is prepared as follows:

Adding 0.1 g single-walled carbon nanotubes and 10 mL 0.2 mol/L $MgCl_2$ solution to a beaker, stirring with a glass rod, then adding 20 mL 70 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute nitric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 110° C. for 3 min to obtain a hydroxylated single-walled carbon nanotube powder.

Adding 3 g ethyl orthosilicate to 2 mL ethanol and stirring well; and then adding 10 mL dilute nitric acid (having a $C_H^+$ concentration of 1 mol/L), 0.2 g $La(NO_3)_3$, 2.5 g tungstophosphoric heteropolyacid and 0.02 g said hydroxylated single-walled carbon nanotube powders thereto, stirring well, and then carrying out ultrasonic treatment for 5 min to obtain a second mixture solution.

Allowing the second mixture solution to stand for 18 h at 28° C. to obtain a gel, which was dried in an incubator at 120° C. for 5 min, then taken out, and ground into powder to obtain a rare-earth modified Keggin-type heteropolyacid-supported catalyst.

Embodiment 4

Provided is a rare-earth modified Keggin-type heteropolyacid-supported catalyst, which is prepared as follows:

Adding 0.3 g single-walled carbon nanotubes and 10 mL 0.2 mol/L $AlCl_3$ solution to a beaker, stirring with a glass rod, then adding 20 mL 70 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 1.5 mL ethanol and stirring well; and then adding 10 mL dilute nitric acid (having a $C_H^+$ concentration of 1 mol/L), 0.15 g $La(NO_3)_3$, 3 g tungstophosphoric heteropolyacid and 0.01 g said hydroxylated single-walled carbon nanotube powders thereto, stirring well, and then carrying out ultrasonic treatment for 5 min to obtain a second mixture solution.

Allowing the second mixture solution to stand for 24 h at 25° C. to obtain a gel, which was dried in an incubator at 110° C. for 5 min, then taken out, and ground into powder to obtain a rare-earth modified Keggin-type heteropolyacid-supported catalyst.

Embodiment 5

Provided is a rare-earth modified Keggin-type heteropolyacid-supported catalyst, which is prepared as follows:

Adding 0.1 g multi-walled carbon nanotubes and 10 mL 0.2 mol/L AlCl$_3$ solution to a beaker, stirring with a glass rod, then adding 20 mL 70 wt % ethanol thereto, and carrying out ultrasonic treatment for 3 min to uniformly disperse the multi-walled carbon nanotubes in the solution. After the ultrasonic treatment is completed, adding 2 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 3 g ethyl orthosilicate to 2 mL ethanol and stirring well; and then adding 10 mL dilute nitric acid (having a $C_H^+$ concentration of 1 mol/L), 0.2 g La(NO$_3$)$_3$, 2.5 g tungstophosphoric heteropolyacid and 0.02 g said hydroxylated multi-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 5 min, then taken out, and ground into powder to obtain a rare-earth modified Keggin-type heteropolyacid-supported catalyst.

Embodiment 6

Provided is a rare-earth modified Keggin-type heteropolyacid-supported catalyst, which is prepared as follows:

Adding 0.1 g multi-walled carbon nanotubes and 10 mL 0.2 mol/L AlCl$_3$ solution to a beaker, stirring with a glass rod, then adding 20 mL 70 wt % propyl alcohol thereto, and carrying out ultrasonic treatment for 3 min to uniformly disperse the multi-walled carbon nanotubes in the solution. After the ultrasonic treatment is completed, adding 2 mL 0.1 mol/L dilute hydrochloric acid solution dropwise to the solution and carrying out microwave treatment for 4 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 5 g ethyl orthosilicate to 2.5 mL ethanol and stirring well; and then adding 10 mL dilute nitric acid (having a $C_H^+$ concentration of 1 mol/L), 0.2 g La(NO$_3$)$_3$, 2 g tungstophosphoric heteropolyacid and 0.02 g said hydroxylated multi-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Embodiment 7

Provided is a rare-earth modified Keggin-type heteropolyacid-supported catalyst, which is prepared as follows:

Adding 0.1 g single-walled carbon nanotubes and 10 mL 1 mol/L AlCl$_3$ solution to a beaker, stirring with a glass rod, then adding 20 mL 99 wt % propyl alcohol thereto, and carrying out ultrasonic treatment for 2 min to uniformly disperse the single-walled carbon nanotubes in the solution. After the ultrasonic treatment is completed, adding 2 mL 0.1 mol/L dilute nitric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 2 mL propyl alcohol and stirring well; and then adding 9 mL dilute nitric acid (having a $C_H^+$ concentration of 1 mol/L), 0.2 g La(NO$_3$)$_3$, 2.5 g tungstophosphoric heteropolyacid and 0.01 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 5 min, then taken out, and ground into powder to obtain a rare-earth modified Keggin-type heteropolyacid-supported catalyst.

Embodiment 8

Provided is a rare-earth modified Keggin-type heteropolyacid-supported catalyst, which is prepared as follows:

Adding 0.2 g single-walled carbon nanotubes and 8 mL 0.2 mol/L MgCl$_2$ solution to a beaker, stirring with a glass rod, then adding 10 mL 70 wt % propyl alcohol thereto, and carrying out ultrasonic treatment for 2 min to uniformly disperse the single-walled carbon nanotubes in the solution. After the ultrasonic treatment is completed, adding 2 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 2 mL ethanol and stirring well; and then adding 9 mL dilute nitric acid (having a $C_H^+$ concentration of 1 mol/L), 0.2 g La(NO$_3$)$_3$, 2.5 g tungstophosphoric heteropolyacid and 0.05 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 5 min, then taken out, and ground into powder to obtain a rare-earth modified Keggin-type heteropolyacid-supported catalyst.

Embodiment 9

Provided is a rare-earth modified Keggin-type heteropolyacid-supported catalyst, which is prepared as follows:

Adding 0.3 g single-walled carbon nanotubes and 10 mL 0.2 mol/L AlCl$_3$ solution to a beaker, stirring with a glass rod, then adding 10 mL 70 wt % propyl alcohol thereto, and carrying out ultrasonic treatment for 2 min to uniformly disperse the single-walled carbon nanotubes in the solution. After the ultrasonic treatment is completed, adding 1 mL 0.1 mol/L dilute hydrochloric acid solution dropwise to the solution and carrying out microwave treatment for 4 min, and washing repeatedly with deionized water to a pH of neutral to obtain a first mixture solution, then filtering the first mixture solution to obtain a residue, and drying the residue in an oven at 115° C. for 6 min to obtain hydroxylated single-walled carbon nanotube powder.

Adding 4 g ethyl orthosilicate and 10 mL dilute nitric acid (having a $C_H^+$ concentration of 1 mol/L) to 2 mL ethanol and stirring well; and then adding 0.1 g La(NO$_3$)$_3$, 2 g tungstophosphoric heteropolyacid and 0.04 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 5 min, then taken out, and ground into powder to obtain a rare-earth modified Keggin-type heteropolyacid-supported catalyst.

Embodiment 10

Provided is a rare-earth modified Keggin-type heteropolyacid-supported catalyst, which is prepared as follows:

Adding 0.2 g single-walled carbon nanotubes and 10 mL 0.2 mol/L AlCl$_3$ solution to a beaker, stirring with a glass rod, then adding 20 mL 70 wt % ethanol thereto, and carrying out ultrasonic treatment for 4 min to uniformly disperse the single-walled carbon nanotubes in the solution. After the ultrasonic treatment is completed, adding 2 mL 0.1 mol/L dilute nitric acid solution dropwise to the solution and carrying out microwave treatment for 3 min, and washing repeatedly with deionized water to a pH of neutral to obtain a first mixture solution, then, filtering the first mixture solution to obtain a residue, and drying the residue in an oven at 115° C. for 6 min to obtain a hydroxylated single-walled carbon nanotube powder.

Adding 4 g ethyl orthosilicate to 2 mL ethanol and stirring well; and then adding 10 mL dilute nitric acid (having a $C_H^+$ concentration of 1 mol/L), 0.1 g La(NO$_3$)$_3$, 2 g silicotungstic heteropolyacid and 0.02 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Embodiment 11

Provided is a rare-earth modified Keggin-type heteropolyacid-supported catalyst, which is prepared as follows:

Adding 0.2 g single-walled carbon nanotubes and 10 mL 0.2 mol/L MgCl$_2$ solution to a beaker, stirring with a glass rod, then adding 20 mL 90 wt % ethanol thereto, and carrying out ultrasonic treatment for 4 min to uniformly disperse the single-walled carbon nanotubes in the solution. After the ultrasonic treatment is completed, adding 2 mL 0.1 mol/L dilute nitric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 2 mL ethanol and stirring well; and then adding 10 mL dilute sulphuric acid (having a $C_H^+$ concentration of 1 mol/L), 0.1 g La$_2$(SO$_4$)$_3$, 2 g tungstophosphoric heteropolyacid and 0.03 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Embodiment 12

Provided is a rare-earth modified Keggin-type heteropolyacid-supported catalyst, which is prepared as follows:

Adding 0.2 g single-walled carbon nanotube and 10 mL 0.2 mol/L MgCl$_2$ solution to a beaker, stirring with a glass rod, then adding 20 mL 90 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute nitric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 2 mL ethanol and stirring well; and then adding 10 mL dilute hydrochloric acid (having a $C_H^+$ concentration of 1 mol/L), 0.1 g LaCl$_3$, 2 g tungstophosphoric heteropolyacid and 0.02 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Embodiment 13

Provided is a rare-earth modified Keggin-type heteropolyacid-supported catalyst, which is prepared as follows:

Adding 0.1 g single-walled carbon nanotubes and 10 mL 0.2 mol/L AlCl$_3$ solution to a beaker, stirring with a glass rod, then adding 20 mL 90 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute hydrochloric acid solution dropwise to the solution, and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g ethyl orthosilicate to 2 mL ethanol and stirring well; and then adding 10 mL dilute nitric acid (having a $C_H^+$ concentration of 1 mol/L), 0.1 g Ce(NO$_3$)$_4$, 2 g tungstophosphoric heteropolyacid and 0.01 g said hydroxylated single-walled carbon nanotube powders thereto, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Embodiment 14

Provided is a rare-earth modified Keggin-type heteropolyacid-supported catalyst, which is prepared as follows:

Adding 0.5 g single-walled carbon nanotubes and 10 mL 0.2 mol/L $MgCl_2$ solution to a beaker, stirring with a glass rod, then adding 20 mL 90 wt % ethanol thereto, and carrying out ultrasonic treatment for 3 min to uniformly disperse the single-walled carbon nanotubes in the solution. After the ultrasonic treatment is completed, adding 2 mL 0.1 mol/L dilute hydrochloric acid solution dropwise to the solution and carrying out microwave treatment for 3 min, and washing repeatedly with deionized water to a pH of neutral to obtain a first mixture solution, then filtering the first mixture solution to obtain a residue, and drying the residue in an oven at 115° C. for 6 min to obtain a hydroxylated single-walled carbon nanotube powder.

Adding 4 g $AlCl_3$ and 10 mL dilute nitric acid (having a $C_H^+$ concentration of 1 mol/L) to 2 mL propyl alcohol and stirring well; and then adding 0.1 g $Ce(NO_3)_4$, 2 g phospho-molybdic heteropolyacid and 0.05 g said hydroxylated single-walled carbon nanotube powders, stirring well, and then carrying out ultrasonic treatment for 5 min to obtain a second mixture solution.

Allowing the second mixture solution to stand for 24 h at 20° C. to obtain a gel, which was dried in an incubator at 110° C. for 4 min, then taken out, and ground into powder to obtain a rare-earth modified Keggin-type heteropolyacid-supported catalyst.

Comparative Example 1

Provided is a rare-earth modified Keggin-type heteropolyacid-supported catalyst, which is prepared as follows:

0.04 g hydroxylated single-walled carbon nanotube powder obtained in embodiment 1 of the present invention, 2 g phospho-molybdic heteropolyacid and 0.1 g $La(NO_3)_3$ were ground, and then calcined in a muffle furnace at 300° C. for 3 h to obtain a single-walled carbon nanotube supported La-modified phospho-molybdic heteropolyacid catalyst.

Comparative Example 2

Provided is a rare-earth modified Keggin-type heteropolyacid-supported catalyst, which is prepared as follows:

Treating single-walled carbon nanotubes with 25 wt % strong oxidizing nitric acid, washing and suction-filtering to obtain a residue, and drying the residue in an oven for 6 min at 115° C. to obtain a nitrated single-walled carbon nanotube powder.

Adding 4 g ethyl orthosilicate to 2 mL ethanol and stirring well; and then adding 10 mL dilute nitric acid (having a $C_H^+$ concentration of 1 mol/L), 0.1 g $La(NO_3)_3$, 2 g tungstophosphoric heteropolyacid and 0.01 g said nitrated single-walled carbon nanotube powders thereto, stirring well, and then carrying out ultrasonic treatment for 5 min to obtain a mixture solution.

Allowing the mixture solution to stand for 12 h at 35° C. to obtain a gel, which was dried in an incubator at 110° C. for 4 min, then taken out, and ground into powder to obtain a rare-earth modified Keggin-type heteropolyacid-supported catalyst.

Test Example 1 Catalytic Activity Test of Catalyst

In the present invention, the catalytic activity of the catalysts obtained in embodiments 1-14 and comparative examples 1-2 are tested. The conversion rate of oleic acid is tested under the following conditions:

Temperature: 65° C.,
Molar ratio of methanol to oleic acid: 8:1,
Content of catalyst: 1% of the total mass,
Reaction time: 5 h.
The results are shown in Table 1.

TABLE 1

Test and analysis of catalytic activity

| No. | Conversion rate of oleic acid % |
|---|---|
| Embodiment 1 | 92 |
| Embodiment 2 | 81 |
| Embodiment 3 | 91 |
| Embodiment 4 | 90 |
| Embodiment 5 | 80 |
| Embodiment 6 | 81 |
| Embodiment 7 | 89 |
| Embodiment 8 | 87 |
| Embodiment 9 | 87 |
| Embodiment 10 | 88 |
| Embodiment 11 | 89 |
| Embodiment 12 | 88 |
| Embodiment 13 | 90 |
| Embodiment 14 | 88 |
| Comparative Example 1 | 60 |
| Comparative Example 2 | 62 |

The comparison of the data in Table 1 shows that, when the catalysts obtained in the embodiments 1-14 of the present invention are used in the catalytic reaction, the conversion ratio of oleic acid is 81-93%, which is obviously better than that of Comparative Examples 1-2.

Test Example 2 Stability Performance Test of Catalyst

The stability performance of the catalyst obtained in embodiment 1 is tested. Biodiesel is prepared by repeatedly carrying out esterification reaction of oleic acid and methanol at a temperature of 65° C. for a period of 5 h, wherein a molar ratio of methanol to oleic acid is 8:1, and the catalyst accounts for 1% of the total mass. In order to test the repeatability of catalyst $La^{3+}$/TPA, after each reaction is completed, the catalyst is washed to remove the oleic acid and methyl oleate thereon, then dried, and reused to carry out esterification by adding oleic acid and certain amount of methanol. The repeating times of esterification reactions and the conversion rates of oleic acid are shown in table 2.

TABLE 2

Stability performance test of catalyst obtained in embodiment 1

| Number of cycles | 1 | 2 | 3 | 4 | 5 |
|---|---|---|---|---|---|
| Conversion rate of oleic acid % | 93 | 91 | 87 | 85 | 82 |

The data in Table 2 shows that, as the number of cycles increases from 1 to 5, the conversion rate of the oleic acid catalyzed by the catalyst prepared by the present invention decreases from 93% to 82%, i.e. a decrease rate of 11.8%. However, the conversion rate decrease is insignificant on the whole, indicating the catalyst of the present invention has good stability.

Test Example 3 Composition and Structure Test of Catalyst

The catalyst obtained in embodiment 1 of the present invention and the tungstophosphoric heteropolyacid catalyst are analyzed with an elemental analyzer. The results are shown in Table 3.

TABLE 3

Results of elemental composition analysis

| Element | Tungstophosphoric heteropolyacid catalyst | Catalyst obtained in embodiment 1 of the present invention |
|---|---|---|
| O | 32.101 | 31.22 |
| Si | 0.084 | 13.9 |
| P | 0.884 | 0.226 |
| Fe | 1.187 | 0 |
| W | 69.515 | 50.4 |
| La | 0 | 0.579 |

The comparison of the data in Table 3 shows that the catalyst obtained in the present invention is a rare-earth modified phospho-molybdic heteropolyacid catalyst.

The catalyst obtained in embodiment 1 was analyzed by transmission electron microscopy (TEM), and the results are shown in FIG. 1. FIG. 1 shows that there are dense points on the surface of the catalyst prepared in the present invention, which may be caused by the loading of the tungstophosphoric heteropolyacid on the surface.

Figure 2:
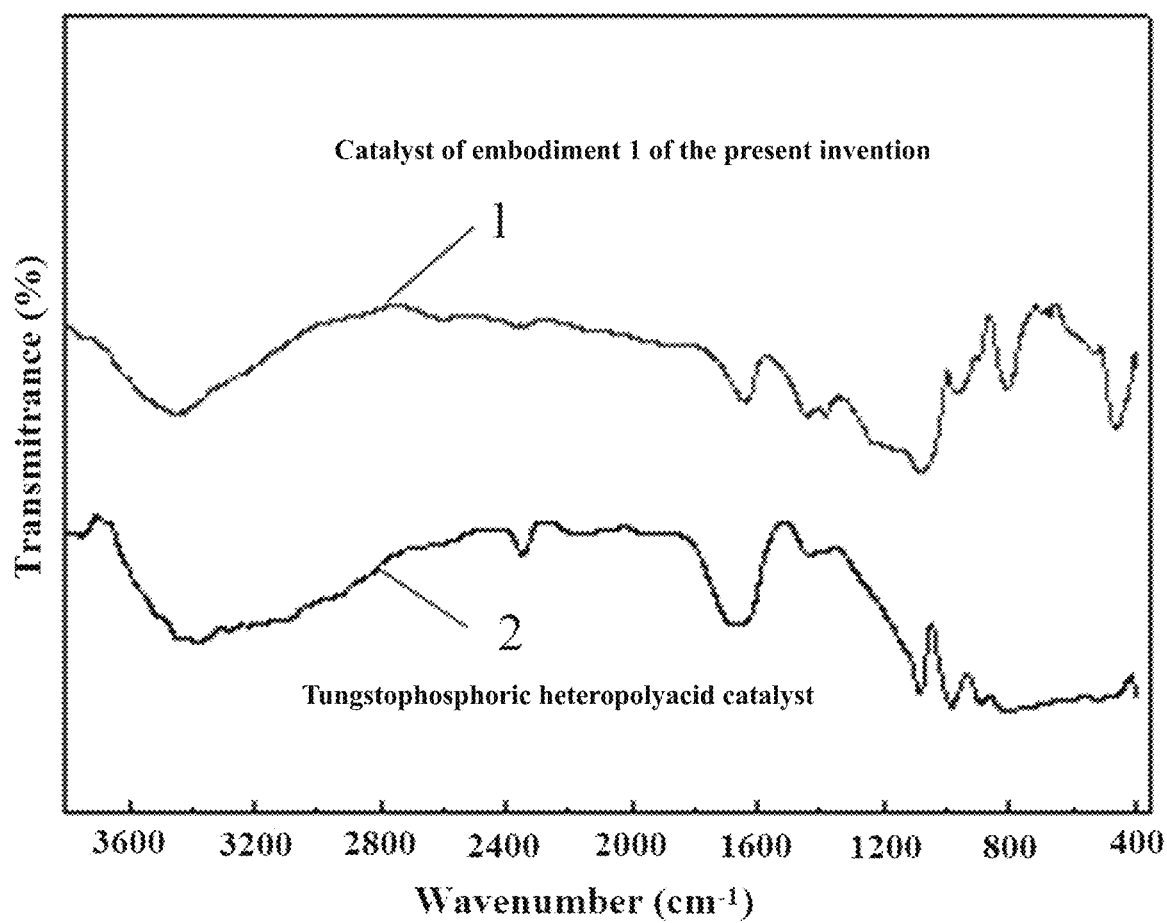
FIG. 2 shows an infrared spectrogram of the catalyst obtained in embodiment 1 of the present invention and tungstophosphoric heteropolyacid catalyst.

The catalyst obtained in embodiment 1 of the present invention and the tungstophosphoric heteropolyacid catalyst are respectively analyzed with an infrared spectroscopy, and the results are shown in FIG. 2. FIG. 2 shows that at 800-1100 $cm^{-1}$ of the infrared spectrum, there is no significant difference between the catalyst prepared in the present invention and tungstophosphoric heteropolyacid, both showing four characteristic peaks of the Keggin structure, respectively corresponding to P—O vibration absorption peak at 1080 $cm^{-1}$, W=O vibration absorption peak at 977 $cm^{-1}$, co-point W-Oa-O vibration absorption peak at 895 $cm^{-1}$ and co-edge W-Ob-O vibration absorption peak at 808 $cm^{-1}$. However, there are still some differences in the infrared spectra between the catalyst prepared in the present invention and the tungstophosphoric heteropolyacid catalyst, such as the Si—O—Si stretching vibration absorption peak at 1090 $cm^{-1}$, and Si—O stretching vibration absorption peak at 465 $cm^{-1}$, indicating that the catalyst prepared in the present invention comprises Si—O bond.

Figure 3:
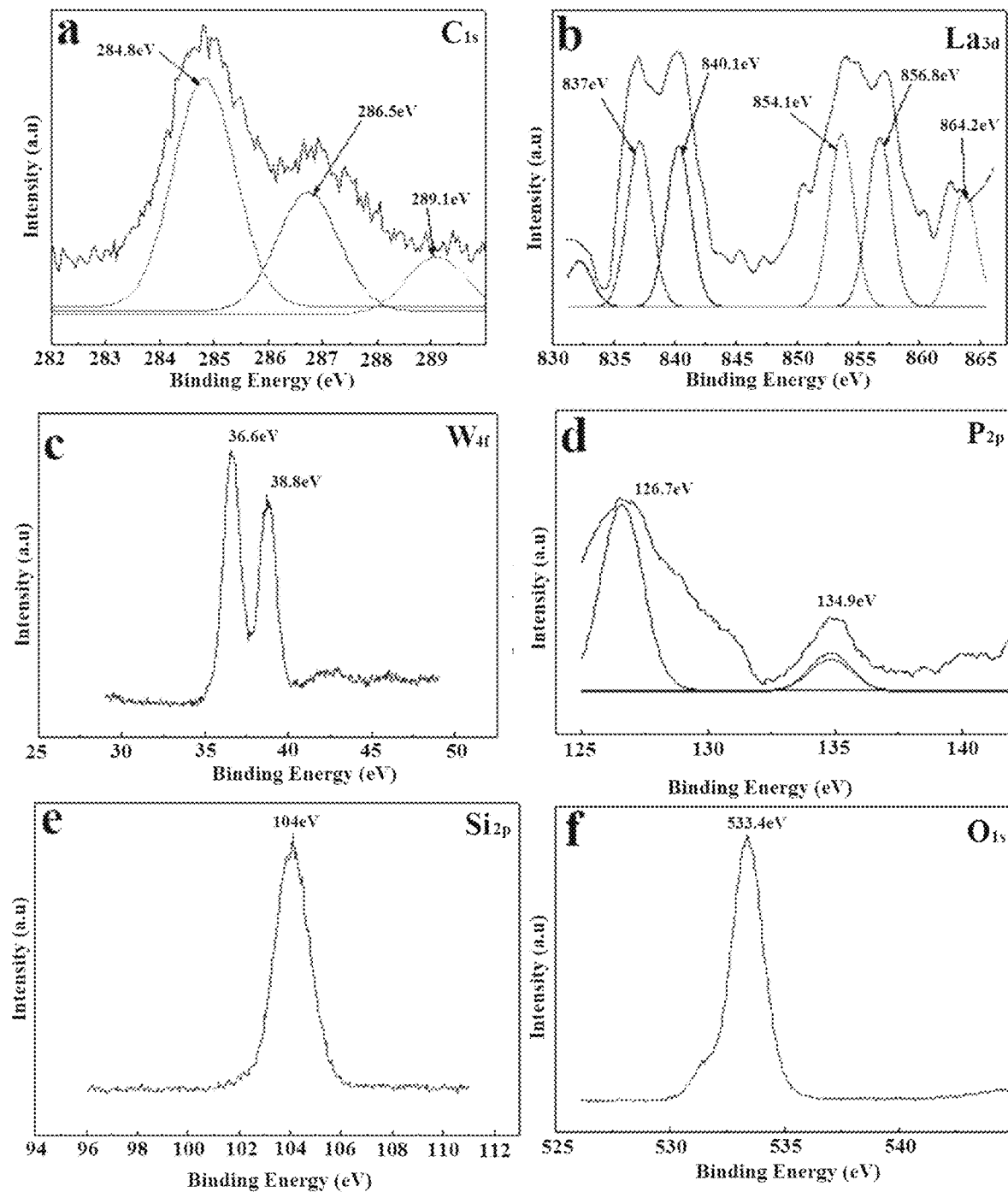
FIG. 3 shows an X-ray photoelectron energy spectrum of the catalyst obtained in embodiment 1 of the present invention.

The catalyst obtained in embodiment 1 of the present invention is analyzed with X-ray photoelectron spectroscopy, and the results are shown in FIG. 3. FIG. 3 shows that catalyst C1s prepared in the present invention mainly consists of three peaks, corresponding to C=C and C—C bonds at the binding energy of 284.8 eV, C—O bonds at the binding energy of 286.7 eV and O=C—O bond at the binding energy of 289.1 eV, respectively. The photoelectron absorption peaks of $La3d_{5/2}$ and $La3d_{3/2}$ appear at 840.1 eV and 864.2 eV, respectively, indicating that the binding energies of $La3d_{5/2}$ and $La3d_{3/2}$ have shifted to the direction of high energy, which is due to electron transfer between highly localized π electrons and $La^{3+}$. The photoelectron absorption peaks of $W4f_{7/2}$ and $W4f_{5/2}$ appear at the binding energies of 36.6 eV and 38.7 eV, respectively. The photoelectron absorption peaks of P2p show $P^0$ with a binding energy of 126.7 eV and $P^{5+}$ with a binding energy of 134.9 eV, combining with the Si2p spectrum with a stable binding energy at 104 eV, it can be concluded that Si has entered the keggin structure, and has formed a complex with P.

Test Example 4 Acid Test of Catalyst

Figure 4:
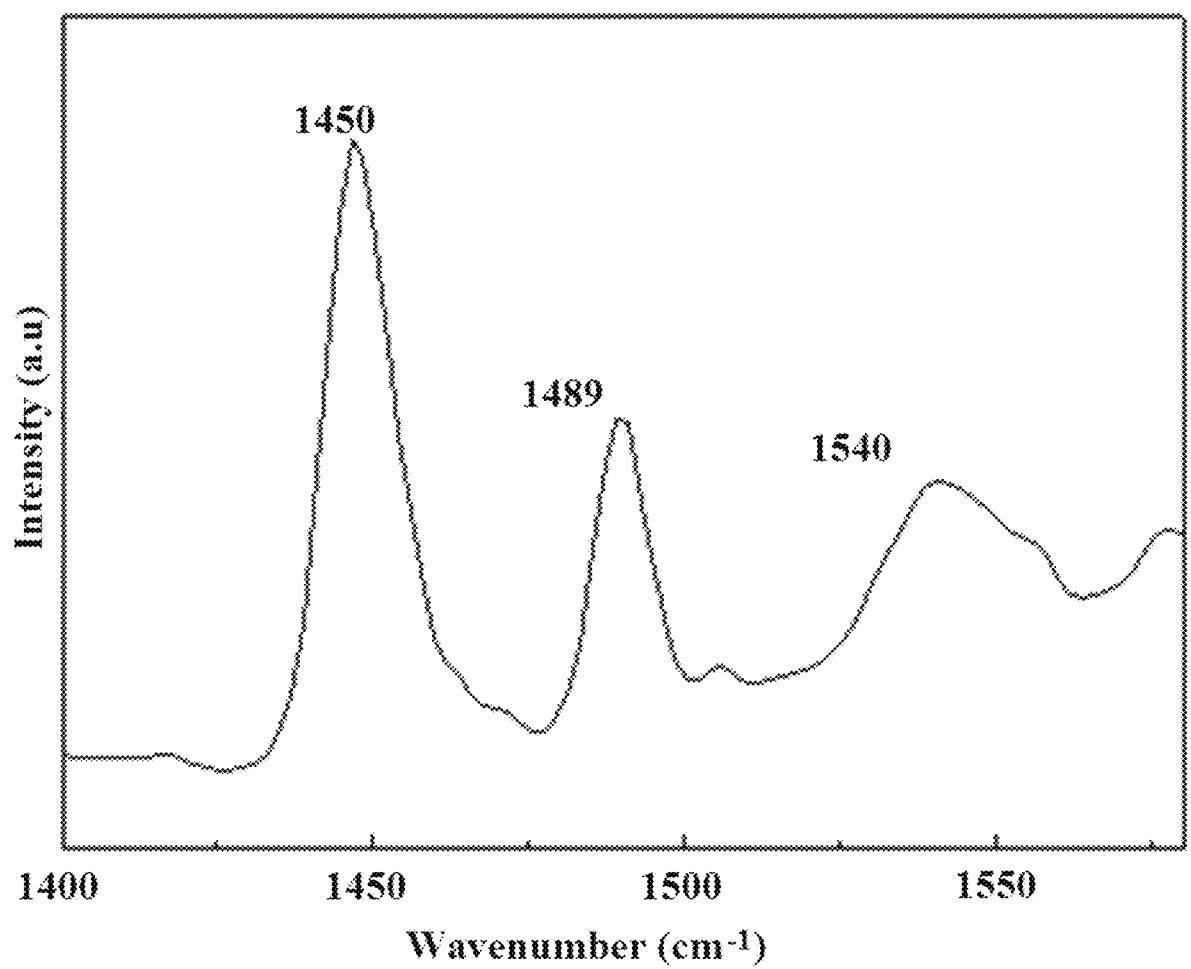
FIG. 4 shows an infrared pyridine probe spectrum of the catalyst obtained in embodiment 1 of the present invention.

The catalyst obtained in embodiment 1 of the present invention is analyzed with an infrared pyridine probe spectrometer, and the results are shown in FIG. 4. FIG. 4 shows that, two characteristic peaks appear at the wave numbers of 1450 $cm^{-1}$ and 1540 $cm^{-1}$, which are the characteristic peaks corresponding to Lewis acid site and Brönsted acid site, respectively, and the peak at the wave number of 1450 $cm^{-1}$ is stronger than the peak at the wave number of 1540 $cm^{-1}$, indicating that the catalyst prepared in the present invention is a Lewis acid-based catalyst.

Figure 5:
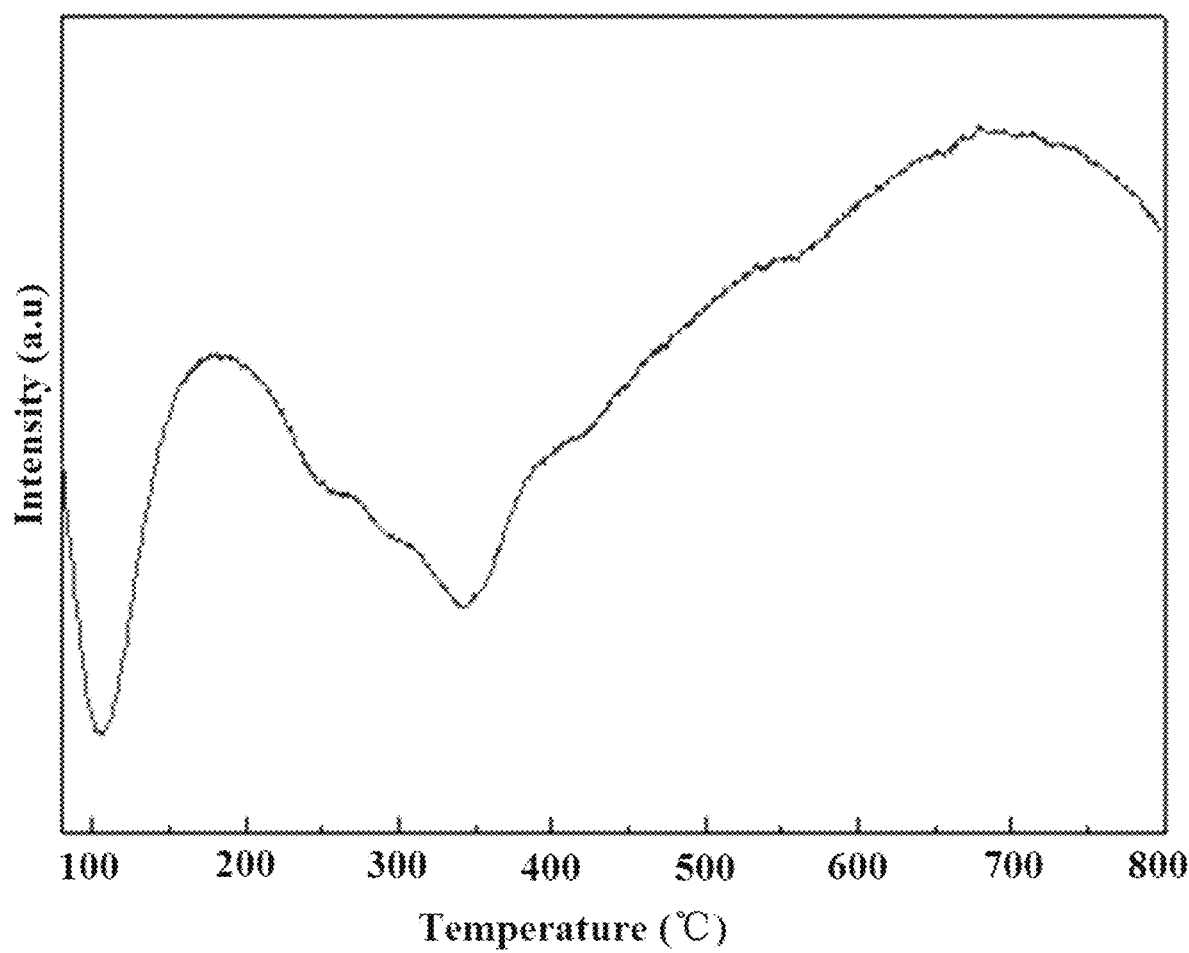
FIG. 5 shows a temperature-programmed desorption of ammonia for the catalyst obtained in embodiment 1 of the present invention.

The catalyst obtained in embodiment 1 of the present invention is studied by ammonia temperature-programmed desorption method, and the results are shown in FIG. 5. FIG. 5 shows that the catalyst prepared in the present invention has desorption peaks at 100-250° C. and 600-700° C., respectively, belonging to the weak acid position and the strong acid position, respectively. Furthermore, the desorption peak curve at 600-700° C. is broader, indicating that the catalyst has more strong acid sites, combining with the results of the infrared pyridine probe analysis of the catalyst, it can be seen that the catalyst prepared in the present invention is more likely to be a strong Lewis acids.

Test Example 5 Conversion Rate of Catalytic Reaction of Catalyst

Figure 6:
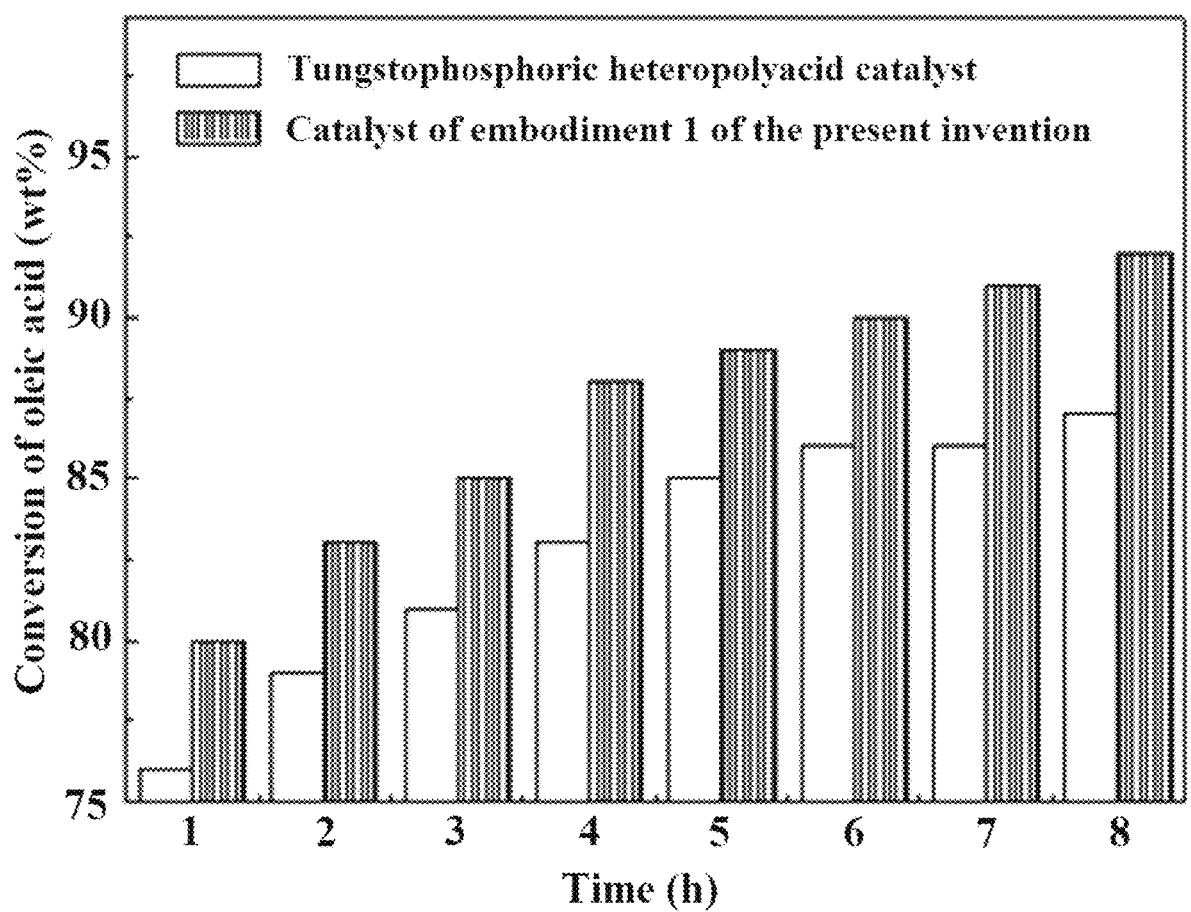
FIG. 6 shows conversion rate of oleic acid catalyzed by the catalyst obtained in embodiment 1 of the present invention and tungstophosphoric heteropolyacid catalyst.

The conversion rates of catalytic reactions using the catalyst obtained in embodiment 1 of the present invention and tungstophosphoric heteropolyacid catalyst are tested under the following experimental conditions: preparing a biodiesel from oleic acid and methanol by carrying out esterification reaction at a temperature of 65° C., wherein the molar ratio of methanol to oleic acid is 8:1, and the mass of the catalyst accounts for 1% of the total mass. The conversion rates of oleic acid are tested when the reaction is carried out for 1 h, 2 h, 3 h, 4 h, 5 h, and 6 h, respectively, and the results are shown in FIG. 6. It can be seen from FIG. 7 that the conversion rates of the catalytic reaction using the catalyst prepared in the present invention are significantly higher than that of phosphotungstic acid. When the reaction time is 8 h, the conversion rates of oleic acid using the catalyst prepared in the present invention and phosphotungstic acid are 92% and 86%, respectively.

Figure 7:
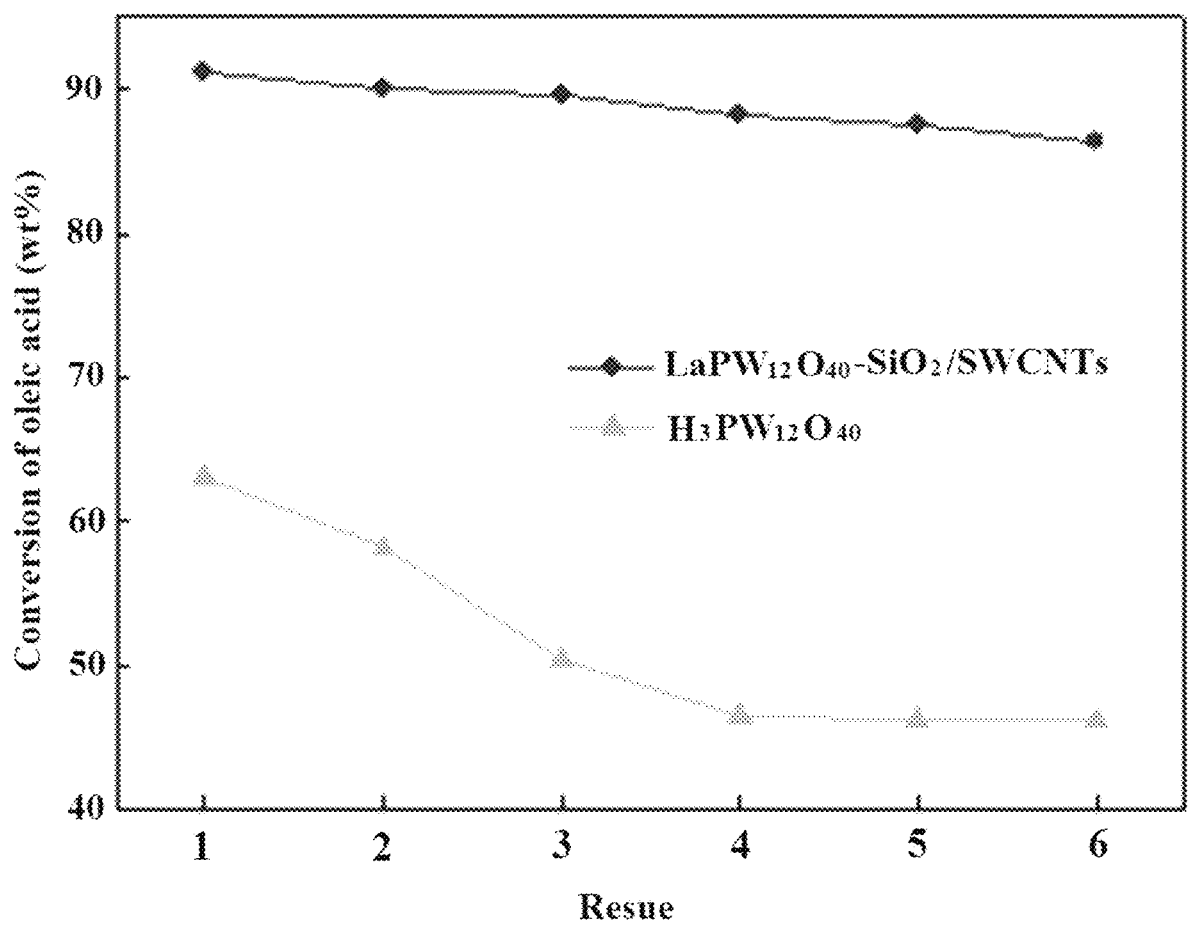
FIG. 7 shows a conversion curve of oleic acid circularly catalyzed by the catalyst obtained in in embodiment 1 of the present invention and tungstophosphoric heteropolyacid catalyst.

The catalyst obtained in embodiment 1 of the present invention and the tungstophosphoric heteropolyacid catalyst are repeatedly used for 6 times, respectively, and the conversion rates of oleic acid are tested when the reaction is carried out for 8 h each time, and a change trend chart of the conversion rates of the catalytic reaction is drawn according to the test results, as shown in FIG. 7. It can be seen from FIG. 7 that with the increase of the numbers of cyclic catalysis, the conversion rate of oleic acid catalyzed by phosphotungstic acid decreases significantly. After 6 times of cyclic catalysis, the conversion rates of oleic acid catalyzed by the catalyst prepared in the present invention and phosphotungstic acid are 88.7% and 45%, respectively, indicating that the catalyst prepared in the present invention has good stability and catalytic performance.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

What is claimed is:

1. A method for preparing a rare-earth modified Keggin-type heteropolyacid-supported catalyst, comprising the steps of:
   (1) preparing a first mixture solution by dispersing a carbon nanotube, a metal chloride and a first acid solution in a first alcohol solvent, filtering the first mixture solution to produce a first filter cake, and drying the first filter cake to obtain a hydroxylated carbon nanotube;
   (2) preparing a second mixture solution by dispersing a metal precursor, a second acid solution, a rare earth compound, a Keggin-type heteropolyacid and the hydroxylated carbon nanotube in a second alcohol solvent, wherein the rare earth compound has at least one rare earth element selected from the group consisting of lanthanum, cerium, praseodymium, neodymium, promethium and samarium; and
   (3) allowing the second mixture solution to stand until a gel is formed, drying the gel to obtain a rare earth modified Keggin-type heteropolyacid-supported catalyst.

2. The method of claim 1, wherein, in the step (1), the carbon nanotube is a single-walled carbon nanotube or a multi-walled carbon nanotube; the metal chloride is AlCl3 and/or MgCl2; the first acid solution is at least one selected from a group consisting of nitric acid solution, a sulfuric acid solution, and a hydrochloric acid solution, having a H+ concentration of 0.1 mol/L to 1 mol/L; and the first alcohol solvent is an ethanol solvent or a propanol solvent, having a concentration of 60 wt % to 99 wt %.

3. The method of claim 2, wherein, the step (1) comprises:
   preparing the first mixture solution by mixing 0.1 g to 0.5 g of the carbon nanotube, 8 mL to 10 mL of a solution of the metal chloride having a concentration of 0.1 mol/L to 1 mol/L and 10 mL to 20 mL of the first alcohol solvent uniformly, subjecting the resulted solution to ultrasonic treatment for 2 min to 10 min, then adding 1 mL to 2 mL of the first acid solution to the solution, and further subjecting the solution to microwave treatment for 1 min to 8 min, and adjusting the solution to a pH of neutral, and
   filtering the first mixture solution to obtain the first filter cake, and drying the first filter cake to obtain a hydroxylated carbon nanotube powder.

4. The method of claim 3, wherein, in the step (2), the metal precursor is a silicic acid organic alcohol ester and/or a silicon alkoxide; the second acid solution is at least one selected from the group consisting of a nitric acid solution, a sulfuric acid solution, and a hydrochloric acid solution, having a H+ concentration of 0.1 mol/L to 1 mol/L; the rare earth compound is rare earth chloride or rare earth nitrate; and the Keggin-type heteropolyacid is at least one selected from the group consisting of tungstophosphoric heteropolyacid, phospho-molybdic heteropolyacid and silicotungstic heteropolyacid; and the second alcohol solvent is an ethanol solvent or a propanol solvent.

5. The method of claim 4, wherein, the step (2) comprises:
   preparing the second mixture solution by dispersing 3 g to 5 g of the metal precursor, 8 mL to 10 mL of the second acid solution, 0.1 g to 0.2 g of the rare earth compound, 2 g to 2.5 g of the Keggin-type heteropolyacid and 0.1 g to 0.5 g of the hydroxylated carbon nanotube in 2 mL to 2.5 mL of the second alcohol solvent.

6. The method of claim 5, wherein, said preparing the second mixture solution in the step (2) comprises:
   mixing the metal precursor, the second alcohol solvent and the second acid solution uniformly, and then adding the rare earth compound, the Keggin-type heteropolyacid and the hydroxylated carbon nanotube; or
   mixing the metal precursor and the second alcohol solvent uniformly, and then adding the second acid solution, the rare earth compound, the Keggin-type heteropolyacid and the hydroxylated carbon nanotube.

7. The method of claim 3, wherein,
   in the steps (1) and (3), the drying is carried out at a temperature of 110° C. to 120° C. for a period of 3 min to 8 min; and
   in the step (3), the second mixture solution is allowed to stand for a period of 12 h to 24 h at a temperature of 20° C. to 35° C.

8. The method of claim 2, wherein, in the step (2), the metal precursor is a silicic acid organic alcohol ester and/or a silicon alkoxide; the second acid solution is at least one selected from the group consisting of a nitric acid solution, a sulfuric acid solution, and a hydrochloric acid solution, having a H+ concentration of 0.1 mol/L to 1 mol/L; the rare earth compound is rare earth chloride or rare earth nitrate; and the Keggin-type heteropolyacid is at least one selected from the group consisting of tungstophosphoric heteropolyacid, phospho-molybdic heteropolyacid and silicotungstic heteropolyacid; and the second alcohol solvent is an ethanol solvent or a propanol solvent.

9. The method of claim 8, wherein, the step (2) comprises:
   preparing the second mixture solution by dispersing 3 g to 5 g of the metal precursor, 8 mL to 10 mL of the second acid solution, 0.1 g to 0.2 g of the rare earth compound, 2 g to 2.5 g of the Keggin-type heteropolyacid and 0.1 g to 0.5 g of the hydroxylated carbon nanotube in 2 mL to 2.5 mL of the second alcohol solvent.

10. The method of claim 9, wherein, said preparing the second mixture solution in the step (2) comprises:
    mixing the metal precursor, the second alcohol solvent and the second acid solution uniformly, and then adding the rare earth compound, the Keggin-type heteropolyacid and the hydroxylated carbon nanotube; or
    mixing the metal precursor and the second alcohol solvent uniformly, and then adding the second acid solution, the rare earth compound, the Keggin-type heteropolyacid and the hydroxylated carbon nanotube.

11. The method of claim 2, wherein,
    in the steps (1) and (3), the drying is carried out at a temperature of 110° C. to 120° C. for a period of 3 min to 8 min; and
    in the step (3), the second mixture solution is allowed to stand for a period of 12 h to 24 h at a temperature of 20° C. to 35° C.

12. The method of claim 1, wherein, in the step (2), the metal precursor is a silicic acid organic alcohol ester and/or a silicon alkoxide; the second acid solution is at least one selected from the group consisting of a nitric acid solution, a sulfuric acid solution, and a hydrochloric acid solution, having a H+ concentration of 0.1 mol/L to 1 mol/L; the rare earth compound is rare earth chloride or rare earth nitrate; and the Keggin-type heteropolyacid is at least one selected from the group consisting of tungstophosphoric heteropolyacid, phospho-molybdic heteropolyacid and silicotungstic heteropolyacid; and the second alcohol solvent is an ethanol solvent or a propanol solvent.

13. The method of claim 12, wherein, the step (2) comprises:
preparing the second mixture solution by dispersing 3 g to 5 g of the metal precursor, 8 mL to 10 mL of the second acid solution, 0.1 g to 0.2 g of the rare earth compound, 2 g to 2.5 g of the Keggin-type heteropolyacid and 0.1 g to 0.5 g of the hydroxylated carbon nanotube in 2 mL to 2.5 mL of the second alcohol solvent.

14. The method of claim 13, wherein, said preparing the second mixture solution in the step (2) comprises:
mixing the metal precursor, the second alcohol solvent and the second acid solution uniformly, and then adding the rare earth compound, the Keggin-type heteropolyacid and the hydroxylated carbon nanotube; or
mixing the metal precursor and the second alcohol solvent uniformly, and then adding the second acid solution, the rare earth compound, the Keggin-type heteropolyacid and the hydroxylated carbon nanotube.

15. The method of claim 14, wherein,
in the steps (1) and (3), the drying is carried out at a temperature of 110° C. to 120° C. for a period of 3 min to 8 min; and
in the step (3), the second mixture solution is allowed to stand for a period of 12 h to 24 h at a temperature of 20° C. to 35° C.

16. The method of claim 12, wherein,
in the steps (1) and (3), the drying is carried out at a temperature of 110° C. to 120° C. for a period of 3 min to 8 min; and
in the step (3), the second mixture solution is allowed to stand for a period of 12 h to 24 h at a temperature of 20° C. to 35° C.

17. The method of claim 13, wherein,
in the steps (1) and (3), the drying is carried out at a temperature of 110° C. to 120° C. for a period of 3 min to 8 min; and
in the step (3), the second mixture solution is allowed to stand for a period of 12 h to 24 h at a temperature of 20° C. to 35° C.

18. The method of claim 1, wherein,
in the steps (1) and (3), the drying is carried out at a temperature of 110° C. to 120° C. for a period of 3 min to 8 min; and
in the step (3), the second mixture solution is allowed to stand for a period of 12 h to 24 h at a temperature of 20° C. to 35° C.

19. A method for preparing a biodiesel, comprising the steps of:
preparing a rare-earth modified Keggin-type heteropolyacid-supported catalyst with the method of claim 1,
preparing a reaction product from a grease and methanol by carrying out esterification and transesterification reactions in the presence of the rare-earth modified Keggin-type heteropolyacid-supported catalyst, and
increasing the pH of the reaction product to a range of 8 to 9, washing with water, drying, followed by vacuum distilling to obtain the biodiesel.

20. The method of claim 19, wherein, the catalyst accounts for 0.2% to 1.5% of a total mass of the grease and the methanol, and the esterification and transesterification reactions are carried out at a temperature of 55° C. to 70° C. for a period of 3 h to 6 h.

* * * * *